E. H. BELDEN.
SPRING SUSPENSION FOR MOTOR VEHICLES.
APPLICATION FILED NOV. 5, 1917.
1,407,915.
Patented Feb. 28, 1922.
3 SHEETS—SHEET 1.
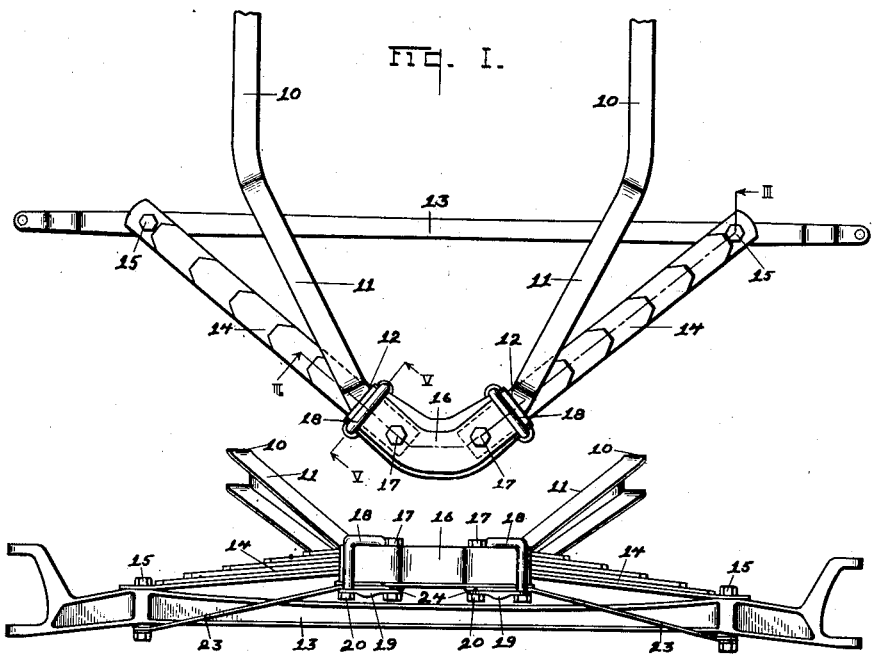
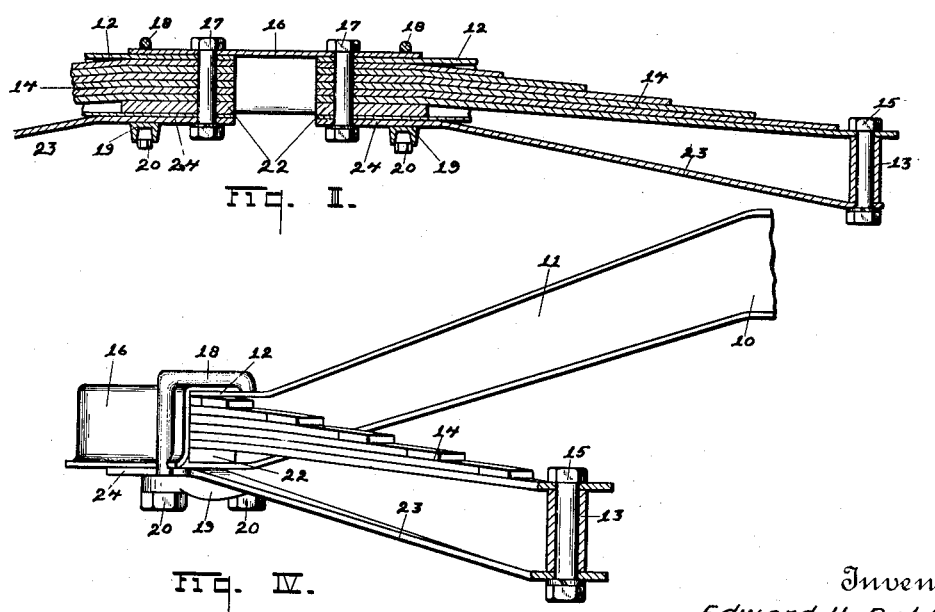
Inventor
Edward H. Belden
By Chester H Braselton
Attorney

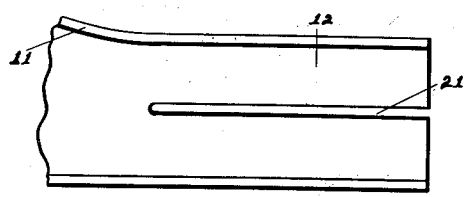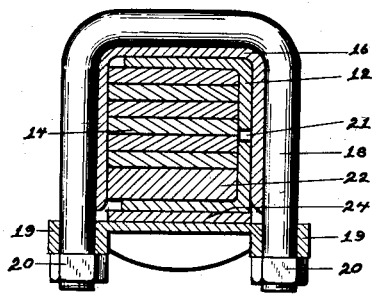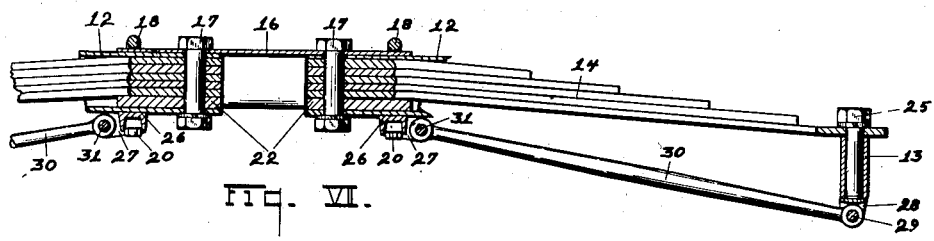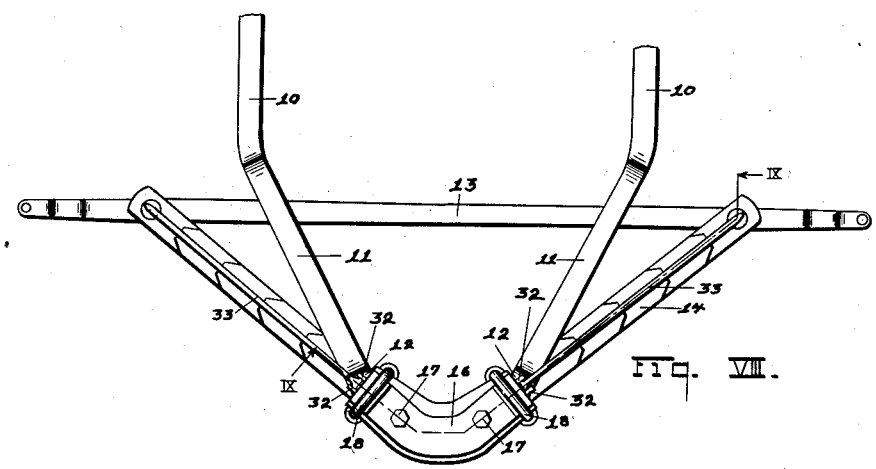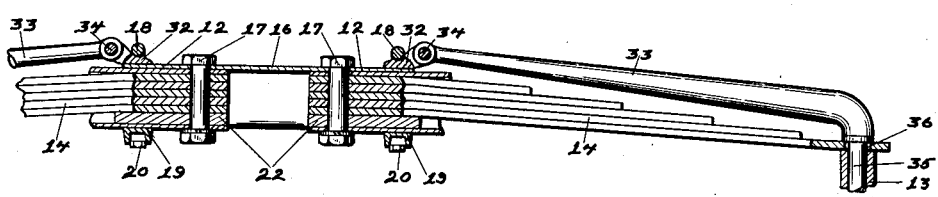

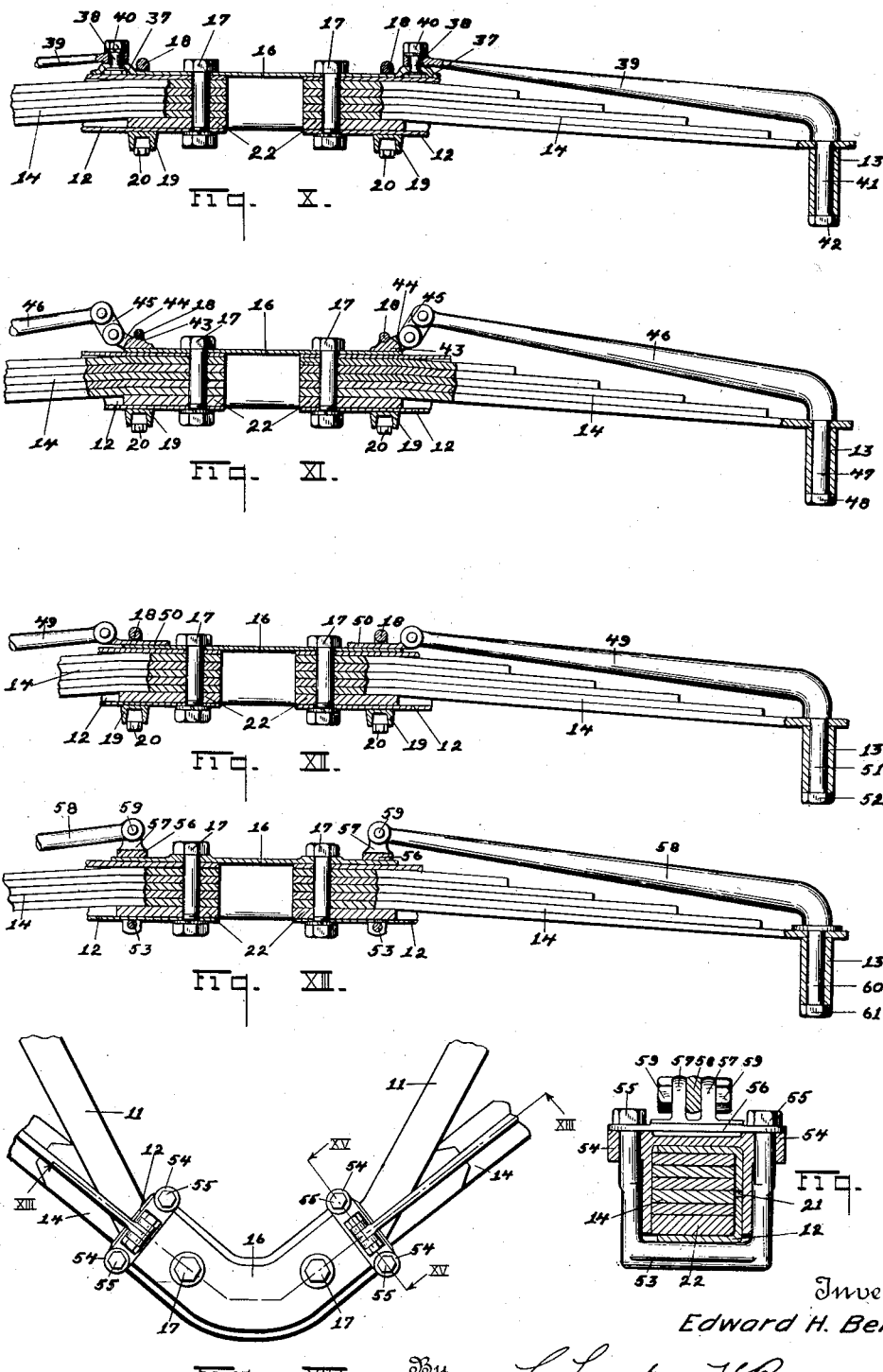

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SPRING SUSPENSION FOR MOTOR VEHICLES.

1,407,915. Specification of Letters Patent. Patented Feb. 28, 1922.

Application filed November 5, 1917. Serial No. 200,333.

*To all whom it may concern:*

Be it known that I, EDWARD H. BELDEN, a citizen of the United States, residing at Toledo, in the county of Lucas and State of Ohio, have invented certain new and useful Improvements in Spring Suspensions for Motor Vehicles, of which I declare the following to be a full, clear, and exact description.

This invention relates to improvements in spring suspension for motor vehicles.

The principal object of this invention is to provide an improved suspension for the frame of a motor vehicle, whereby the forward end of the motor vehicle frame will be connected to the front axle by means of springs and other connecting devices in such a manner as to provide a very easy riding car and one which steers very easily.

A further object of my invention is to provide a motor vehicle running gear having combined spring and radius bar connections between the front axle and the front end of the frame of such a nature as to compel the movements of the axle when passing over uneven ground to be substantially parallel, so that the top and bottom edges of the axle stay at all times in a substantially vertical plane.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention, is illustrated in the accompanying drawing forming a part of this specification, in which—

Fig. I is a top plan view of the forward portion of a motor vehicle running gear, embodying my invention, the frame and connections between the frame and front axle alone being shown, and the wheels and other parts connected with the front axle being omitted.

Fig. II is a view in front elevation of the forward portion of a vehicle frame, as shown in Fig. I.

Fig. III is a detail, sectional view, taken substantially on the line III—III of Fig. I.

Fig. IV is a view in side elevation of the forward portion of a vehicle frame, taken in section through the axle at the point of connection of one of the springs to the axle.

Fig. V is a detail, sectional view, taken substantially on the line V—V of Fig. I.

Fig. VI is a detail view in side elevation of the forward end of one of the channel members comprising the frame.

Fig. VII is a view corresponding to Fig. III, and showing a modified form of my invention.

Fig. VIII is a view corresponding to Fig. I, and showing a modified form of my invention.

Fig. IX is a detail, sectional view, taken substantially on the line IX—IX of Fig. VIII, a portion of the spring being shown in side elevation and a portion in section.

Fig. X is a view corresponding to Figs. III, VII and IX, but showing a modified form of my invention.

Fig. XI is a corresponding view showing a still further modification of my invention.

Fig. XII is a corresponding view, showing another modification of my invention.

Fig. XIII is a corresponding view, taken substantially on the line XIII—XIII of Fig. XIV, and showing a still further modification of my invention.

Fig. XIV is an enlarged, fragmentary, plan view of the forward portion of a vehicle frame, showing a modification of my invention, and Fig. XV is a detail, sectional view, taken substantially on the line XV—XV of Fig. XIV.

In the drawings, similar reference numerals refer to similar parts throughout the several views, and the sectional views are taken looking in the direction of the little arrows at the ends of the section lines.

Considering the numbered parts of the drawing. I have shown a motor vehicle frame, comprising the pair of channel members 10, having their forward ends downwardly and inwardly inclined as at 11, and provided with the horizontally extending portions 12, which are inclined inwardly towards each other, as is shown by dotted lines in Fig. I. The front axle 13 is of the usual I-beam construction and is connected with the forward end of the frame, made up of the channel members 10, by means of the cantilever springs 14, which are substantially straight and are connected to the forward end of the frame, at a point in advance of the axle 13, and are connected at their rear ends to the axle 13, so that they converge from the axle to their points of connection with the forward end of the frame. The portions 11 of the frame member 10 are so inclined that the horizontal portions 12, to which the forward ends of the springs 14 are connected, lie substantially in the horizontal plane of the steering spindles, which are carried at the ends of the axle 13.

A bolt 15 extends through the rear end of each of the springs 14 and through the axle 13, by means of which the rear ends of the springs 14 are connected to the front axle 13. The forward ends of the springs 14, the thicker or butt ends of the springs, are disposed within the forward portions 12 of the channel members 10, being embraced within the channels as clearly shown in Figs. III and V. A spacing block 22 is disposed within each channel, beneath the butt end of the spring 14, so as to space the end of the spring from the lower wall of the channel. A yoke 16 slips over the forward horizontal portions 12 of the frame member and embraces the forward ends of said frame member and the forward ends of the springs 14. Bolts 17 extend through the yoke 16, the frame members 12, the forward ends of the springs 14, and the spacer blocks 22. Shackle bolts 18 embrace the yoke 16 and the forward ends of the frame members and springs and the free ends of said bolts pass through the keeper bars 19, which extend beneath the channels 12 and are secured to the shackle bolts by means of the nuts 20, threaded on the free ends of the shackle bolts 18.

A pair of spring bars 23 connect the lower edge of the front axle 13 with the forward portion of the frame. The rear end of each of the bars 23 is disposed in line with one of the bolts 15, connecting the rear ends of the springs to the front axle, and are secured to the front axle by means of said bolt. The forward portions of the bars 23 terminate in the horizontal portions 24, which abut the lower faces of the horizontal portions 12 of the frame members and through which the bolts 17 pass, by means of which said bars 23 are rigidly connected to the forward portion of the frame. The horizontal portions 24 of the bars 23 are disposed between the keeper bars 19, and the lower surface of the channel members 12. The spring members 14 and 23 are substantially parallel and both are flexible, so that, while they permit the front axle to rise and fall in response to variations in the surface of the road, they compel a parallel movement of said front axle so that it is always maintained in a substantially vertical plane.

The spacer blocks 22 serve to space the ends of the springs 14 and the spring bars 23, so as to cause them to approach parallelism more nearly. A longitudinally extending slot 21 is formed in the base of each of the horizontal portions 12 of the channel members 10, so that, when the bolts 17 are tightened, the side walls of the channel serve to clamp the spring in place, the horizontal portions 12, due to this slot 21, serving as a sort of spring clamp.

In Fig. VII, I have shown another modification of my invention, in which the bolts 25, which extend through the front axle and connect the rear ends of the springs 14 to the front axle, are provided at their lower ends with heads 28, in each of which is pivotally connected the rear end of a bar 30, by means of a pin 29. The free ends of the shackle bolts 18, which embrace the yoke 16, the forward portions 12 of the channel members and the springs 14, pass through the keeper bars 26, which are secured in place by the nuts 20, threaded on the ends of the shackle bolts 18. The keeper bars 26 are each provided with a pair of laterally projecting ears 27, between each pair of which the forward end of one of the bars 30 is pivoted by means of a pin 31, so that the bar 30 is pivotally connected, at its forward end, to the frame member substantially in line with the forward end of the spring, and, at its rear end, to the front axle substantially in line with the rear end of one of the springs, so that the bars 30 extend substantially parallel to the springs 14 and insure a parallel movement of the front axle, while not offering any substantial resistance to the flexibility of the springs.

In Figs. VIII and IX, I have shown another modification of my invention in which a pair of blocks 32 are provided, which rest on the upper surface of the yoke 16 and are secured in place by the shackle bolts 18, which engage said blocks and bind them to the yoke and to the forward end of the frame. These blocks 32 are each provided with a pair of laterally projecting ears, between which the forward end of one of the bars 33 is pivoted by the pin 34. Each of the bars 33 has a downwardly extending stem 35, which extends through the front axle and through an elongated opening 36, provided in the rear end of each of the springs 14, so that by this means, the arm 33 is rigidly connected to the front axle, and its forward end is pivotally connected to the frame through the block 32, which is secured to the frame by the shackle bolts 18. The elongated slot 36 allows a slight movement of the spring 14, relative to the front axle and to the arm 33, and the pivotal connection 34 at the forward end of the arm 33, permits the arm to rise and fall with the movement of the axle, while insuring a substantially vertical movement of the axle under the influence of varying road surfaces.

In Fig. X, I have shown another modification of my invention, in which a pair of bars 39 are provided, each of which has a downwardly extending stem 41 at its rear end, which extends through the rear end of the spring 14 and through the front axle 13, and is held in place by nut 42, by means of which the spring 14 and the bar 39 are rigidly connected to the axle 13. A pair of bosses 37 are struck up from the upper surface of the yoke 16 and each forms a seat for the head of a stud 38, which extends through an opening formed in the boss 37. The studs 38 extend through elongated openings formed in the forward ends of the bars 39 and the nuts 40, threaded on the ends of the studs 38, maintain the connection between the bars 39 and the yoke. The elongated openings 38 allow a slight movement of the bar relative to the stud, and this is, in effect, a pivotal connection between the forward end of the bar 39 and the yoke.

In Fig. XI, I have shown another modification of my invention in which blocks 43 are provided, which engage the upper surface of the yoke 16 and are secured thereto by the shackle bolts 18, which engage the same and firmly connect them with the yoke 16 and the forward end of the frame. These blocks 43 are provided with the rearwardly projecting ears 44, to which are pivotally connected the links 45, pivotally connecting each of the blocks 43 with the forward end of one of the bars 46. Each of the bars 46 has a downwardly extending stem 47, which extends through the rear end of one of the springs 14 and through the front axle 13, and has a nut 48 threaded on the end thereof by means of which the bar 46 and the rear end of the spring 14 is rigidly connected to the front axle 13. The link connection 44 permits of the free movement of the springs 14, while this forms a connection which provides for a substantially parallel movement of the axle so that it will maintain a vertical plane.

In Fig. XII, I have shown another form of my invention in which a pair of plates 50 are provided, which slidably engage the upper surface of the yoke 16. Said plates are held in position by the shackle bolts 18, which hold them in engagement with the yoke 16, this engagement being such that there may be a slight slippage of the plates 50 relative to the yoke 16 and the springs. The plates 50 are pivotally connected to the forward ends of the bars 49, each of said bars having the downwardly extending stem 51, extending through the rear end of one of the springs 14 and through the front axle 13, and nuts 52 threaded on the lower ends of the stems 51 and connecting the bars 49 and the springs 14 to the axle 13.

In Figs. XIII, XIV, and XV, I have shown another form of my invention, in which the shackle bolts 53 embrace the yoke 16, the forward portions 12 of the frame members and the springs 14. These shackle bolts 53 pass under the frame members 12 and the free ends thereof extend upwardly through ears 54 provided on the yoke 16 and through openings provided in the plates 56, which extend across the upper surface of the yoke 16. Nuts 55 are threaded on the free ends of the shackle bolts 53 and hold the plates 56 in place relative to the yoke 16 and the frame. Said plates 56 are provided with the upstanding ears 57, between which the forward ends of the bars 58 extend, being pivotally connected thereto by the bolts 59. The bars 58 are each provided at their rear end with a downwardly extending stem 60, which extends through the rear end of the spring 14 and through the axle 13, and has the nut 61 threaded thereon to secure the parts together.

From the description of the parts given above, the operation of my device should be very readily understood. It will be observed that I have provided connections between the forward end of the frame and the front axle, which, while they do not interfere with the flexibility of the spring, afford a supplementary connection between the front end of the frame and the front axle, which, while permitting the front axle to rise and fall, under the influence of varying road surfaces, still compels the front axle to have such a movement that it will always be maintained in vertical plane. This is of importance because it makes the easy riding qualities of the motor vehicle better, and also makes a better steering vehicle as there will be no tendency for the vibration of the front axle, as it goes over rough ground, to be transmitted to the steering mechanism to cause a jerking or twisting of the steering wheel.

Referring to the form of my device, shown in Figures I to VI inclusive, it will be seen that the connections between the forward end of the frame and the front axle, as represented by the spring members 14 and 23, have substantially the same effect as a pair of parallel links connecting the forward end of the frame and the front axle and they act as a parallel linkage to keep the axle 13 at all times in a vertical plane. The form of my device shown in these views is to be preferred, because there are no joints or pivotal connections to work loose and rattle and the operation of the device depends upon the flexibility of the spring radius bar 23. The other views of the drawing show modifications of this invention, all of which embody the same general principle but illustrate other ways by which this result can be attained.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a motor vehicle, the combination of a frame; a front axle; a pair of cantilever springs, each connected at one end to the forward end of said frame and, diverging rearwardly, to said axle; and a pair of radius bars each extending substantially parallel to one of said springs and connected, at one end, to said frame and, at the other end, to said axle.

2. In a motor vehicle, the combination of a frame; a front axle; a pair of cantilever springs, each connected at its rear end to said axle and extending and converging forwardly from said axle, the forward ends of said springs being connected to the forward end of said frame; and a pair of radius bars each extending substantially parallel to one of said springs and connected, at one end, to the forward end of said frame and, at the other end, to said axle.

3. In a motor vehicle, the combination of a frame; a front axle; a pair of substantially straight cantilever springs, each connected, at one end, to the front axle and, at the other end, to the forward end of said frame at a point in front of said axle and substantially in line with the mid point of and in the horizontal plane of said axle, and radius rods substantially paralleling said springs and secured to the frame and axle respectively.

4. In a motor vehicle, the combination of a front axle adapted to carry steering spindles; a frame, the forward end of said frame being dropped downwardly and having a forward portion extending substantially in the horizontal plane of the steering spindles; a pair of substantially straight cantilever springs each connected, at one end, to the axle and, at the other end, to the forward portion of said frame, and radius rods substantially paralleling said springs and secured to the frame and axle respectively.

5. In a motor vehicle, the combination of a frame, comprising a pair of channel members having their forward ends turned towards and disposed adjacent each other; a front axle; a pair of cantilever springs, each having its forward end disposed in the channel of the forward portion of one of said frame members; a yoke embracing the forward portions of said frame members and said springs; bolts passing through said yoke, said frame members and said springs; the other ends of said springs being connected to the upper surface of said front axle; and a pair of spring bars disposed parallel to said springs and each connected at one end to the forward part of the frame member and at the other end to the underside of said axle.

6. In a motor vehicle, the combination of a frame, comprising a pair of channel members having their forward ends turned towards and disposed adjacent each other; a front axle; a pair of cantilever springs, each having its forward end disposed in the channel of the forward portion of one of said frame members; a pair of spacing blocks disposed in said channels beneath said springs; a yoke embracing the forward ends of said springs and said channel members; bolts connecting said yoke, channel members and springs together; the rear end of each of said springs being connected to the upper side of said axle; and a pair of spring bars extending substantially parallel to said springs and each connected at its forward end to one of said frame members and at its rear end to the underside of said axle.

7. In a motor vehicle, the combination of a frame, comprising a pair of channel members having their forward ends turned towards and disposed adjacent each other; a front axle; a pair of cantilever springs each having its forward end disposed in one of said channel members; a spacing block disposed in each channel beneath the forward end of each spring; a yoke embracing the forward ends of said channel members and said springs; a pair of spring bars disposed with their forward ends in engagement with the under surfaces of the forward portions of said channel members; and bolts passing through said yoke, said channel members, said springs, said spacer blocks and the forward ends of said spring bars and connecting them all together; the rear ends of said springs and spring bars being connected to the front axle.

8. In a motor vehicle, the combination of a frame, comprising a pair of channel members having their forward ends turned towards and disposed adjacent each other; a front axle; a pair of cantilever springs, each having its forward end disposed in one of said channel members; a spacing block disposed in each channel beneath the forward end of each spring; a yoke embracing the forward ends of said channel members and said springs; a pair of spring bars disposed with their forward ends in engagement with the under surfaces of the forward portions of said channel members; and bolts passing through said yoke, said channel members, said springs, said spacer blocks and the forward ends of said spring bars and connecting them all together, the rear ends of said springs and spring bars being connected to opposite edges of said axle.

9. In a motor vehicle, the combination of a frame, comprising a pair of channel members having their forward ends turned towards and disposed adjacent each other; a front axle; a pair of cantilever springs each having its forward end disposed in one of said channel members; a spacing block disposed in each channel beneath the forward end of each spring; a yoke embracing the forward ends of said channel members and said springs; a pair of spring bars disposed with their forward ends in engagement with the under surfaces of the forward portions of said channel members; bolts passing through said yoke, said channel members, said springs, said spacer blocks and the forward ends of said spring bars and connecting them all together, the rear ends of said springs and spring bars being disposed in engagement with the upper and lower edges of said axle respectively; and a pair of bolts passing through said springs and spring bars and said axle to connect them together.

10. In a motor vehicle, the combination of a frame; a front axle; a pair of cantilever springs, each connected at its rear end to the upper edge of said front axle and at its forward end to the forward portion of said frame, at a point in advance of said front axle, said springs being substantially straight and converging from said front axle to their points of connection with said frame; and a pair of spring bars connected at their rear ends to said front axle and at their forward ends to the forward portion of said frame, substantially in line with the forward ends of said springs.

11. In a motor vehicle, the combination of a frame; a front axle; a pair of cantilever springs, each connected at its rear end to the upper edge of said front axle and at its forward end to the forward portion of said frame, at a point in advance of said front axle, said springs being substantially straight and converging from said front axle to their points of connection with said frame; and a pair of spring bars extending substantially parallel with said springs and connected at their rear ends to the lower edge of said front axle and at their forward ends to the forward part of said frame.

12. In a motor vehicle, the combination of a frame; a front axle; a pair of cantilever springs, each connected at its rear end to the upper edge of said front axle and at its forward end to the forward portion of said frame, at a point in advance of said axle, said springs being substantially straight and converging from said axle to their points of connection with said frame; and a pair of spring bars extending substantially parallel with said springs and each connected at its rear end to the lower edge of said front axle in line with the rear end of one of said springs and at its forward end to the forward part of said frame in line with the forward end of one of said springs.

13. In a motor vehicle, the combination of a frame; a front axle; a pair of cantilever springs, each connected at its forward end to the forward portion of said frame, at a point in advance of said front axle, the rear end of each spring being disposed in engagement with the upper edge of said front axle, said springs being substantially straight and converging from the front axle to their points of connection with the frame; a pair of spring bars extending substantially parallel to said springs and each connected at its forward end to said frame in line with the forward end of one of said springs, the rear ends of said bars being disposed in engagement with the lower edge of said axle; and a pair of bolts passing through the rear ends of said springs and spring bars and through said axle and connecting said springs and bars to said axle.

14. In a motor vehicle, the combination of a frame; a front axle; and a pair of substantially parallel spring members connecting each end of the axle to said frame, the forward ends of said spring members being connected to said frame at a point in advance of said axle, said spring members converging from the axle to their point of connection with the frame and the rear ends of each pair of spring members being connected to said axle and spaced relative to each other.

15. In a motor vehicle, the combination of a frame; a front axle; a pair of cantilever springs, each connected at its rear end to said front axle and, at its forward end to the forward portion of said frame, at a point in advance of said axle, said springs converging from said axle to their points of connection with said frame; and a pair of bars connected with said front axle at points in line with the rear ends of said springs, the forward ends of said bars being connected with the forward end of said frame member.

16. In a motor vehicle, the combination of a frame; a front axle; a pair of cantilever springs, each connected at its rear end to said front axle and at its forward end to the forward portion of said frame, at a point in advance of said front axle, said springs converging from said axle to their points of connection with said frame; a pair of pins extending through the rear ends of said springs and connecting them to said front axle; and pair of bars, the rear end of each bar being connected to one of said pins and the forward end of each bar being connected with said frame at a point adjacent the forward end of said springs.

17. In a motor vehicle, the combination of a frame; a front axle; a pair of cantilever springs, each connected at its rear end to said front axle and at its forward end to the forward portion of said frame, at a point in advance of said axle, said springs converging from said axle to their points of connection with said frame; bolts passing through the rear ends of said springs and said axle and connecting said springs and said axle; and a pair of bars, each of said bars being pivotally connected to one of said bolts on the opposite edge of said axle from said springs, the forward ends of said bars being connected to the frame adjacent the forward ends of said springs.

18. In a motor vehicle, the combination of a frame; a front axle; a pair of cantilever springs, the rear ends of each spring being disposed in engagement with the upper edge of said front axle and connected thereto and the forward ends of said springs being connected to the forward portion of said frame at a point in advance of said axle, said springs converging from said axle to their points of connection with said frame; bolts passing through the rear end of each of said springs and through the front axle; and a bar pivotally connected to the lower end of each bolt, at its rear end, and, at its forward end, connected to said frame adjacent the forward ends of said springs.

19. In a motor vehicle, the combination of a frame; a front axle; a pair of cantilever springs, the rear end of each spring being connected to one edge of said front axle and the forward end of each spring being connected to the forward portion of said frame at a point in advance of said axle, said springs converging from said axle to their points of connection with said frame; a pair of shackle bolts embracing the forward ends of said springs and said frame; a pair of straps through which said shackle bolts extend, said straps being disposed beneath the frame; and a pair of bars, each connected at its forward end to one of said straps and at its rear end to the lower edge of said axle, in line with the rear end of one of said springs.

20. In a motor vehicle, the combination of a frame, comprising a pair of channel members having their forward ends turned towards and disposed adjacent each other; a front axle; a pair of cantilever springs connected at their rear ends to said axle, the forward ends of each of said springs being disposed in the forward portions of said channel members; a yoke embracing the forward ends of said channel members and said springs; bolts connecting said yoke, said channel members and said springs together; shackle bolts embracing said yoke with their ends passing through straps disposed beneath said channel members; a pair of bars, each connected at its forward end to one of said straps and pivotally connected at its rear end to said front axle adjacent the rear end of one of said springs.

21. In a motor vehicle, the combination of a frame, comprising a pair of channel members having their forward portions turned towards and disposed adjacent each other; a front axle; a pair of cantilever springs connected at their rear ends to said front axle, the forward ends of said springs being disposed in the forward portions of said channel members at a point in advance of said axle, said springs converging from said axle to their points of connection with said frame; a yoke embracing the forward ends of said channel members and said springs; bolts passing through said yoke and the forward ends of said springs and said channel members and connecting them together; a pair of shackle bolts embracing said yoke with their ends passing through keeper bars; a pair of bars, each connected to one of said keeper bars; a bolt passing through the rear end of each spring and the front axle, the rear ends of said bars being pivotally connected to the lower ends of said bolts.

22. In a spring suspension for vehicles, a frame, an axle, a pair of cantilever springs each of which is secured at one end to the frame adjacent the longitudinal center line of the frame and at its opposite end to the axle, and a pair of radius rods each of which extends in a direction substantially parallel to one of the springs and is connected at its opposite ends to the frame and axle respectively.

23. In a spring suspension for vehicles, a frame, an axle, a pair of cantilever springs rigidly secured to the frame at points near the longitudinal center line thereof and extending rearwardly and divergently therefrom, the opposite end of each spring being secured to the axle at a point near the end thereof, and a pair of radius rods each of which extend in a direction substantially parallel to one of the springs and is connected at its opposite ends to the frame and axle respectively.

24. In a spring suspension for vehicles, a frame, an axle, a pair of cantilever springs rigidly secured to the frame and extending rearwardly and divergently therefrom, the opposite end of each spring being secured to the axle at a point near one end of the axle, and a pair of radius rods, each of which lies substantially within the vertical plane passing through the points of attachment of each spring to the frame and axle, and is connected at its opposite ends to the frame and axle respectively.

25. In a spring suspension for vehicles, a frame, an axle, a pair of cantilever springs secured to the frame at points near the longitudinal center line thereof and extending divergently therefrom, the opposite end of each spring being secured to the axle, and a radius rod underlying each spring and connected at its opposite ends to the frame and axle respectively.

26. In a spring suspension for vehicles, a frame, an axle, a pair of cantilever springs secured to the frame adjacent the longitudinal center line thereof and diverging therefrom, the opposite ends of said springs being secured to the axle, radius rods underlying said springs, each rod being adapted to be secured to the frame adjacent the point of attachment of each spring thereto, the opposite end of each radius rod being secured to the axle adjacent the point of attachment of the corresponding spring thereto.

27. In a spring suspension for vehicles, a frame, an axle, a pair of cantilever springs connecting said frame and axle and a pair of flexible members underlying each spring, the opposite ends of each flexible member being secured to the frame and axle respectively said springs and flexible members together extending substantially across the vehicle.

28. In a spring suspension for vehicles, a frame, an axle, a pair of cantilever springs, one end of each of which is rigidly secured to the frame near the longitudinal center line, thereof, said springs extending outwardly and downwardly towards the axle, a radius rod connected to the frame adjacent the point of connection of each spring thereto and extending outwardly and downwardly to a point adjacent the point of connection of each spring to the axle, and means for attaching the outer end of each spring and the outer end of the corresponding radius rod to the axle.

29. In a spring suspension for vehicles, a frame, an axle, a pair of cantilever springs connecting said axle with a point on the longitudinal center line of the frame, a pair of radius rods connecting said frame and axle and common means extending through the axle for securing one end of each spring and one end of the corresponding radius rod to the axle.

30. In a spring suspension for vehicles, a frame, an axle, a pair of cantilever springs secured to the frame adjacent the longitudinal center line thereof and diverging therefrom, the outer end of each spring being adapted to be secured to the axle, and a flexible member in the same vertical plane of each spring, the end portions of said member being connected to the frame and axle respectively at points adjacent the points of connection of the corresponding spring thereto.

31. In a spring suspension for vehicles, a frame, an axle, a pair of cantilever springs secured to the frame at points near the longitudinal center line thereof and extending divergently therefrom, the opposite end of each spring being secured to the axle and a pair of radius rods each of which extends in the direction substantially parallel to that of one of the springs and is connected at its opposite ends to the frame and axle respectively, whereby the axle is maintained against tilting upon movement of the frame relative thereto.

32. In a spring suspension for vehicles, a frame, an axle, a pair of cantilever springs secured to the frame at points adjacent the longitudinal center line thereof and extending divergently therefrom, the opposite ends of each spring being secured to the axle and a pair of radius rods each of which underlies one of the springs and is connected at its opposite ends to the frame and axle respectively, whereby the axle is maintained in position and retained against tilting movement upon movement of the frame.

In testimony whereof, I affix my signature.

EDWARD H. BELDEN.